United States Patent [19]

Greer

[11] 3,818,452

[45] June 18, 1974

[54] ELECTRICALLY PROGRAMMABLE LOGIC CIRCUITS

[75] Inventor: David L. Greer, Manlius, N.Y.

[73] Assignee: General Electric Company, Syracuse, N.Y.

[22] Filed: Apr. 28, 1972

[21] Appl. No.: 248,419

[52] U.S. Cl. .......................... 340/166 R, 340/166 S

[51] Int. Cl. .......................... H04q 9/00

[58] Field of Search .......................... 340/166 R

[56] References Cited

UNITED STATES PATENTS

| | | | |
|---|---|---|---|
| 3,229,253 | 1/1966 | Logue | 340/166 R |
| 3,478,319 | 11/1969 | Jordan | 340/166 R |
| 3,593,296 | 7/1971 | Girard | 340/166 R |
| 3,639,908 | 2/1972 | Hovagimyan | 340/166 R |
| 3,656,115 | 4/1972 | Foerster | 340/166 R |
| 3,702,985 | 11/1972 | Proebsting | 340/166 R |

*Primary Examiner*—Harold I. Pitts

*Attorney, Agent, or Firm*—Carl W. Baker; Frank L. Neuhauser; Oscar B. Waddell

[57] ABSTRACT

Disclosed are universal associative logic circuits for use in designing digital systems. The logic circuits comprise an array of storage cells interconnected to form a final circuit configuration which can be electrically altered to make possible the generation of a plurality of logic functions which may be specified after fabrication of the circuit. Programming means are provided to configure the circuit so that it can generate signals representative of a required Boolean function or functions, each function having a single or a multiplicity of output signals and including both combinational and sequential logic forms.

12 Claims, 4 Drawing Figures

ELECTRICALLY PROGRAMMABLE LOGIC CIRCUITS

BACKGROUND OF THE INVENTION

This invention relates generally to associative logic circuits, and more particularly to universal logic circuits suitable for mass fabrication in semiconductor integrated circuit form. More specifically, the invention is related to circuits of a type capable of being electrically reconfigured or programmed subsequent to their manufacture.

According to copending patent application by David L. Greer, entitled "Multiple Level Associative Logic Circuits," filed concurrently herewith and assigned to the assignee of the present application, logic circuits are disclosed wherein an array of logic elements are interconnected in a preselected configuration to implement logic in factored form for generating Boolean functions through multiple levels of combinational logic. According to the present invention, the capability and utility of the aforementioned logic circuits are increased in a manner whereby interconnection of the logic elements to form specified logic structures is effected by programming the logic circuits after their fabrication.

FIELD OF THE INVENTION

In the field of digital equipment implementation as related to, for example, the design of digital computers, large numbers of logic circuits are used. To implement digital equipment at reasonable cost which performs in accordance with specifications often necessitates the use of functional logic circuits having broad universal application as well as logic circuits of special purpose designs.

With the advent of large scale integration it has become increasingly difficult to produce such functional circuits of sufficient complexity to meet all needs. However, batch processing of semiconductor devices provides strong economic incentives for the design of extremely complex logical devices. The field of this invention includes a broad spectrum of such complex devices as commercial standard functional devices for use in medium and large scale integration of digital equipment, read only memories, associative memories, read only associative memories and other logic devices for both general and special purpose applications.

DESCRIPTION OF THE PRIOR ART

Digital circuit design engineers have long sought to develop logic circuits having universal application. In recent years advances in semiconductor technology have brought about significant economic advantages in batch fabricating extremely complex logic devices in monolithic form. As a result, many standard devices have been introduced on the market which attempt to take advantage of these economic benefits. This, however, has led to a proliferation of logic device types for which there is a limited market, since each of these devices is quite limited to a specialized function.

The need exists, therefore, particularly in those situations involving small production quantities, such as in the development of prototype equipment, to produce devices of extreme complexity at reasonable cost that may later be produced in large quantities, also at reasonable cost, for use in production models of the same equipment. In addition, it is well known that design changes are frequent during the design stages or prototype equipment. As such, if a logic device cannot be reused, it must be discarded for a different device.

In the past in such prototyping activity, it has not been possible to take full advantage of large scale integration technology because of the high costs involved in developing special circuits. Some attempts have been made to solve these economic problems. One of these involves the use of read only memories which require masking changes at time of manufacture and which therefore require rather large customizing costs. More recently programmable read only memories have become available using technology involving electrically fusible links or floating gate MOS devices which permit the programming of memory states by the designer. Such read only memory or programmable read only memory devices, however, lack sufficient space efficiency when used to implement logic functions, and thus miss their design objective by prohibiting the use of small numbers of devices of a reasonable size.

Other attempts to program logic subsequent to device manufacture have resulted in various logic devices which are configured by means of additional external leads or pins on the devices to effect reconfiguration of gates within the logic devices. These devices, however, are seriously limited, particularly in respect to the complexity of the logic functions which they are reasonably capable of implementing.

Therefore, it is desirable to provide programmable universal logic devices or circuits for use in applications involving both low and high volume requirements and which are capable of generating single and multiple output Boolean functions and which require substantially the same number of input and output connections or pins as those circuits utilized in the prior art.

SUMMARY OF THE INVENTION

The present invention largely overcomes these problems of the prior art by providing programmable associative logic circuit arrays having means to electrically program or reconfigure the logic circuits such that they function in a way that is consistent with the full and maximum capability of associative logic circuit arrays which are not programmable.

It is important in the circuits of the invention to be able to implement complex Boolean functions having one or more function signals. This is achieved by means of an associative logic array which operates on the principle that any Boolean function can be expressed as the sum-of-products or the product-of-sums of a plurality of function literals or binary variables. In the circuits of the present invention logic is implemented by storing the function implicants or implicates, which represent data items, within an array of logic elements containing electrically programmable storage or memory states. Binary signals applied to the array will produce a function signal whenever a match or association occurs between stored data items and input signals.

In the case of functions in the sum-of-products form, the necessary association of the binary variable signals can be achieved by using AND gates. Similarly, in the case of functions in the product-of-sums form, the association can be achieved by using OR gates.

Since the generation of any one function signal is only dependent upon the existence of a match between selected binary variable signals and stored implicants, the signals from the above-mentioned gates can be combined by means of OR gates to form a plurality of output function signals in the case of functions in the sum-of-products form and combined by AND gates to form a plurality of output function signals in the case of functions in product-of-sums form.

With the preceding in mind, the invention provides a universal logic circuit comprised of a plurality of logic cells comprised of logic elements each having an input and output connected to conductors, wherein the logic elements and conductors are arranged substantially in orthogonally disposed columns and rows. The circuit is programmed to store the data items by programming the storage cells in a preselected manner taking advantage of the existing connections of the storage cells to the conductors.

The invention is applicable to both bipolar semiconductor technology and metal oxide semiconductor (MOS) technology. In the case of bipolar technology, to store a data item, first and second programming means are used to provide sufficient current through selected ones of the logic elements in a logic cell to effect an open circuit at a selected one of the logic elements. In the case of MOS technology, to store a data item, the first and second programming means provide sufficient voltage across selected ones of the logic elements in a logic cell to induce avalanche charge injection resulting in the accumulation of charge on the floating gate of a field effect transistor which is a part of the logic cell selected. Storage of the data item is accomplished in a logic element by the effect of this charge to cause the floating gate transistor to be biased to conduction.

In order to reduce the number of external connections or input-output pins required for electrically programming the logic circuits, the first and second programming means is included in the circuit. In some instances, however, in order to take advantage of increased density on a logic circuit of a given size, it may be desirable to provide the first and second programming means from an external source.

Thus, according to the present invention, logic circuits are provided with increased utility resulting from their ability to be programmed after manufacture, and which are capable of simultaneously implementing combinational and sequential logic in factored or unfactored form to provide a multiplicity of output function signals in binary variable form. In addition, when the logic circuit is implemented in MOS technology, it may be reprogrammed a plurality of times. This may be done by first exposing the storage cells to suitable radiation, such as ultraviolet light, to remove the stored charge from the logic elements and then programming the logic circuit as heretofore described.

In addition to the previously described methods of programming the logic circuits, there are other approaches which may be used. These include silicon nitride and Ovonic processes, avalanche induced migration, and the use of plural gate MOS semiconductor device configurations. The result of applying any of these techniques will provide, after programming, a nonvolatile logic circuit array configured to perform in accordance with the logic structure programmed.

The circuit is compatible with many types of binary digital apparatus such as calculators, peripheral input-output controllers, terminals and digital computers where it is desirable to perform combinational or sequential timing control functions, counting, shift register operations, data storage and time delay.

As will be seen, the invention, utilizing the associative approach to logic implementation, offers the important advantage of being able to accommodate a wide variety of Boolean functions. By electrical programming, a standard undedicated associative logic circuit array may be customized to achieve the implementation of a desired Boolean function or functions. Therefore, this approach makes it possible to design and keep on hand only a few standard associative logic arrays which will, after programming, provide all logic function requirements for general and special purpose logic system design. Thus, cost savings can be realized since large volume production efficiencies can be achieved. In addition, whenever large quantities of a device are to be produced, there is economic incentive to optimize and thoroughly test the design of these devices. In the case of unprogrammed associative logic circuits, therefore, the result will be a thoroughly reliable and tested device providing also the ultimate in logic density possible. Further, electrical programming avoids the lengthy design and fabrication procedures common in the case of custom logic device development today, permitting further economy to be achieved in all phases of the development and manufacture of digital equipment.

It is therefore an object of the present invention to provide universal logic circuits having enhanced logic function capabilities for use in digital systems.

Another object is to provide an electrically programmable logic circuit capable of producing logic devices of large scale integrated circuit complexities at reasonable cost when required either in large and small quantities.

Still another object is to provide an electrically programmable device capable of not only being initially programmed but reprogrammed one or more times after manufacture.

Still another object is to provide an electrically programmable logic device having a plurality of logic cells for storing data items and column and row conductors arranged in substantially orthogonally disposed columns and rows adapted to permit programming to form a logic circuit capable of generating a plurality of function signals representative of Boolean functions in response to a plurality of binary variable input signals.

Still another object is to provide an electrically programmable logic circuit array having a plurality of logic cells arranged in substantially orthogonally disposed columns and rows, interconnected through orthogonally disposed row and column conductors and including programming means by which the logic cells can be selected to store data items in predetermined configuration.

Another object is to provide an electrically programmable logic device in monolithic form capable of being programmed subsequent to the manufacture of the device and having logic elements interconnected through row and column conductors wherein the logic elements may be programmed by address signals applied to the row and column conductors.

Still another object is to provide an electrically programmable logic device having a plurality of logic elements arranged in substantially orthogonally disposed columns and rows including first and second programming means for providing address signals and timing signals for addressing the logic elements in a predetermined program sequence.

The foregoing and other objects will become apparent as this description proceeds and the features of novelty which characterize the invention will be pointed out in particularity in the claims annexed to and forming a part of this specification.

BRIEF DESCRIPTION OF THE DRAWING

The present invention may be more readily described and understood by reference to the accompanying drawing in which.

DESCRIPTION OF THE PREFERRED EMBODIMENT

The present invention is ideally suited for fabrication in integrated circuit form wherein a plurality of logic elements such as diodes, bipolar transistors, or metal oxide semiconductor (MOS) transistors are formed on a single crystal silicon substrate; e.g., P- or N-channel enhancement mode field effect transistors (FET), NPN or PNP bipolar transistors. The substrate may be of other material, however, such as germanium, silicon, or silicon formed on sapphire or other substances. These logic elements may be programmed to form AND, OR, NOR, NAND, or Exclusive OR gates utilizing either positive or negative logic notation. The manner in which these logic gates may be utilized to perform the various types of logic functions is documented in many of the well-known books pertaining to the design and use of logic circuits. For this reason, the basic fundamentals of constructing logic circuits utilizing these various types of semiconductors will not be described, it being understood that those having ordinary skill in the art will readily understand the various ways of implementing the logic elements to construct the circuits of the invention.

Figure 1:
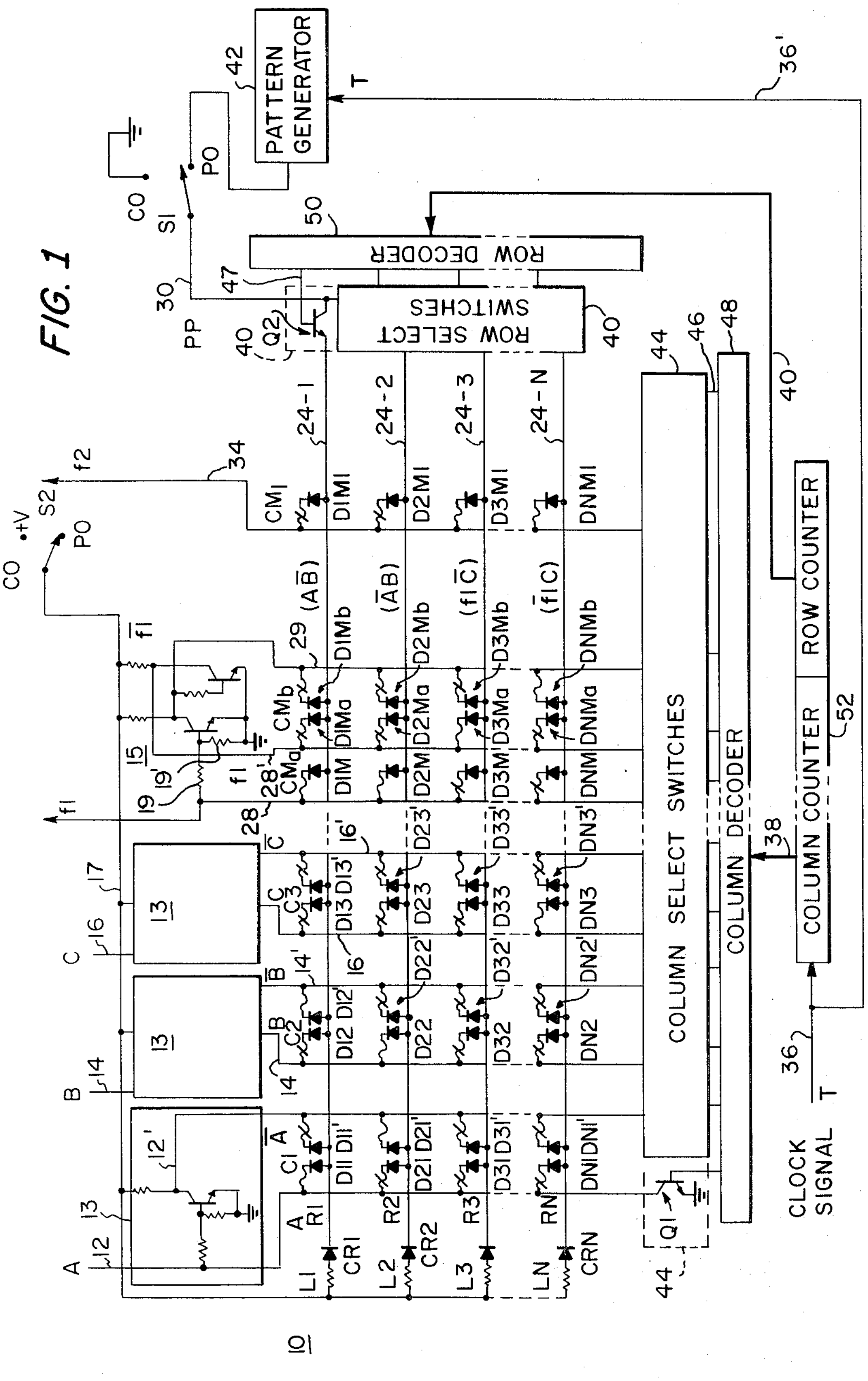
FIG. 1 is a schematic circuit diagram in accordance with the invention utilizing diodes as elements in the logic cell.

Reference is now made to FIG. 1 which illustrates, as one embodiment of the invention, an array or logic circuit 10 utilizing bipolar semiconductor devices, such as diodes, arranged in a plurality of rows R1-RN and columns C1, C2, C3, $CM_a$, $CM_b$, and CM1. Storage cells in the first row R1 are each comprised of diodes (D11, D11'), (D12, D12'), (D13, D13'), (D1M) ($D1M_a$, $D1M_b$), and (D1M1), the number 1 immediately adjacent the D designating the row number. For example, diodes (D21, D21') through (D2M1) comprise row 2, (D31, D31') through (D3M1) comprise row 3, etc. In a similar fashion, the second number to the right of the D designates a particular column of logic cells of diodes. That is, the cells comprising diodes (D11, D11'), (D21, D21'), (D31, D31'), and (DN1, DN1') are located in the left-hand column or column C1, whereas the logic cells comprising diodes (D12, D12') through (DN2, DN2') are located in column C2, etc.

Each of the diodes includes first and second terminals shown as cathode and an anode respectively. Further, each of the logic cells includes a fusible link, one end of which is connected to the cathode of a corresponding diode, the other end being connected to a corresponding one of a plurality of column conductors such as conductors 12 and 12' of column C1 and conductors 28, 28' and 29 in columns $CM_a$ and $CM_b$ respectively.

It will be noted that a plurality of binary variable signals A, B and C are applied, through the fuse links, to the cathodes of the diodes in each of the columns C1, C2, and C3 via a corresponding one of a plurality of identical logic inverters 13 and input conductors 12, 12', 14, 14', and 16, 16' respectively. In column C1, binary variable signal A is applied via conductor 12 to the cathode of each of the diodes D11, D21, D31, DN1. Also, in column C1, a binary variable signal $\bar{A}$ is also applied to the cathode of diodes D11', D21', D31', and DN1' via a logic inverter 13 and conductor 12'.

As shown in column C2, the binary variable signal B is applied via the input conductor 14 through logic inverter 13 to the cathode of corresponding ones of the diodes D12 through DN2 via their fuse links. In a similar fashion the signal $\bar{B}$ is applied to the cathode of each of the diodes D12' through DN2' via their fuse links.

In column C3, the binary variable signal C is applied to the cathode of each of the diodes D13 through DN3 on conductor 16 via inverter 13 and corresponding fuse links. Similarly, a signal $\bar{C}$ is applied, via inverter 13, to the cathodes of diodes D13' through DN3' and their fuse links.

Each of the rows of diodes R1 through RN includes a first common conductor or connecting means (24-1 through 24-N) connecting together the anodes of the diodes in each of the corresponding ones of the rows. For example, the conductor 24-1 connects all of the anodes of the transistors D11, D11' through D1M1 in common.

Conductors 24-1 through 24-N also connect to the emitter electrode of a corresponding one of a plurality of transistors located in a "row select switches" logic block 40, hereinafter referred to as row select switches 40. A one of the transistors in row select switches 40 is indicated at Q2, it being understood that there is a corresponding transistor Q2 related to each of the other rows 24-2 through 24-N.

Additionally it will be noted, for example, as shown in row R1 that the anodes of the diodes are connected in common through a load resistance L1 via a diode CR1 to a potential source conductor 17. Potential source conductor 17 is connected to the center pole of a single pole, double throw switch S2. Switch S2 has two positions designated PO for programming operation and CO for circuit operation. The purpose of switch S2 will subsequently be described. The anodes of the diodes in all of the other rows R2 through RN are also connected to conductor 17 via corresponding ones of diodes CR2 through CRN and load elements L2-LN in a fashion analogous to that described for row R1.

Reference is now made back to the row select switches 40. Each of the transistors Q2 is connected at its collector terminal to a conductor 30, the latter terminating at the center pole of a single pole, double throw switch S1. Switch S1, similarly to S2, has two positions, PO and CO. When S2 is in the PO position as shown, a pattern generator 42 applies a preprogrammed serial pulse train of signals to the collectors of each of the transistors Q2 in row select switches 40.

The pattern generator 42 may be of a well-known type available on the market which may be programmed to generate a predetermined pattern of output signals for activating the transistors Q2.

When switch S1 is placed in the CO position, the conductor 30 is terminated at a ground potential, the purposes of which will subsequently be described.

It will also be noted that the pattern generator 42 receives an input clock signal T on a line 36' from an external source, not shown. Clock signal T is utilized to synchronize the pattern generator 42 during programming operations of the circuit 10.

Clock signal T also is provided to the input of a counter 52 via a conductor 36. Counter 52 is comprised basically of two counters, designated a column counter and a row counter. The row counter represents the least significant bits of the counter 52, and the column counter represents the most significant bits of counter 52.

The row counter provides output signals on a conductor 40 to the input of a row decoder 50. The row decoder 50 responds to the signals from the row counter to generate a plurality of row address output signals on conductors 47. The row address signals are sequentially provided to the base terminal of the transistors Q2 via corresponding ones of the conductors 47. The purpose of the row address signals on lines 47 will be described later in the operational descriptions of the circuit.

Reference is now made back to counter 52 wherein the column counter provides output signals on a conductor 38 to the input of a column decoder 48. The column decoder 48, in a fashion similar to row decoder 50, provides a plurality of column address output signals on conductors 46 to the base input terminal of a corresponding one of a plurality of transistors Q1 of which only one is shown in column select switches 44. Each of the transistors Q1 in select switches 40 has its emitter terminal terminated at a common ground potential.

It will also be noted that the collector of each of the transistors Q1 is connected to a corresponding one of the column conductors. For example, Q1 in the left-hand portion of column select switches 44 is connected to conductor 12. Whereas, transistor Q1 associated with conductor 12' has its collector connected to conductor 12', etc.

Reference is now made to column $CM_a$. A common conductor 28 serves as an output signal source for a function signal f1 and also provides an internal connection for signal $\overline{f1}$ to the input of a logic inverter 15. Via conductor 29, inverter 15 provides the complement of the signal, f1, f1, to the cathode of each of the diodes $D1M_b$, $D2M_b$, $D3M_b$, $DNM_b$ of column $CM_b$ via corresponding fuse links.

Logic inverter 15 also acts as a non-inverting logic element for passing signal f1 therethrough to conductor 28' of column $CM_b$. Conductor 28' is connected to the cathodes of diodes $D1M_a$-$DNM_a$ of column $CM_b$ via corresponding fuse links.

Referring now to column CM1, there is shown a conductor 34 connected to the cathode of diodes D1M1-DNM1 via corresponding fuse links. Conductor 34 provides an output function signal f2, the generation of which will subsequently be described.

It is significant to point out at this time that the logic inverters 13 and 15 and the binary variable signals A, B and C and output function signals f1 and f2 play no part in the operation of the circuit during the programming operation. These inverters and signals A, B and C are utilized to develop function signals f1 and f2 in the exemplificative structure shown after the circuit has been programmed.

Before proceeding with a detailed description of the programming of the circuit of FIG. 1, it is considered advantageous to give a basic description of the operation of the counter 52, the column and row decoders 48 and 50, the row and column select switches 50 and 44, and the pattern generator 42.

The counter 52, as previously described, is comprised of a row counter and a column counter, both of a well-known type. For example, the row counter may be the type which may be reset to a binary count of zero, and then as the clock signal T is applied, it will count from zero to its maximum and return to a count of zero on the application of the next successive clock signal to begin the count cycle all over again. The column counter operates in a similar fashion except that it receives its count signal input from the most significant bit position of the row counter. Thus, for every complete count cycle of the row counter, the column counter will register a count of 1.

The column decoder 48 and the row decoder 50 each receive input signals from their corresponding counters. Both decoders are of a well-known type and decode their input signals to provide the address output signals on conductors 46 and 47 to activate transistors Q1 and Q2 in the column and row select switches 44 and 40 respectively. For example, referring to the row decoder 50, when the row counter generates a count of 1 on line 40, the row decoder will provide a row address output signal on line 47 to the base of transistor Q2 corresponding to row R1. In a similar fashion, when the column counter generates a count of 1 on conductor 38, the column decoder 48 will generate a column address output signal to the base of transistor Q1 corresponding to conductor 12 of column C1. Each of the transistors Q1 and Q2 in column and row selects 44 and 40 will receive signals at the bases thereof as the column and row counters generate count signals corresponding to the individual ones of the columns and rows.

The operation of the transistors Q1 in column select switches 44 is a straight-forward gating element. The transistor is shown to be an NPN transistor, thus a positive output signal on conductor 46 from the column decoder 48 will cause the transistor Q1 to conduct, providing only that its collector is at a positive potential with respect to ground. The operation of the transistors Q2 in the row select switches 40 operate in a manner identical to that of transistors Q1 in column select switches 44.

It will be noted that each of the transistors Q2 receives two input signals. One input signal is on a corresponding one of the conductors 47 to the base terminal, and the other input signal is a signal PP via conductor 30 from the pattern generator 42. In order to cause any one of the transistors Q1 or Q2 to conduct a significant amount of current, no only must the signals applied to their bases be a positive voltage but, at the same time, the signal PP on conductor 30 must also be a positive voltage. If the signal from the pattern generator 42 has a value approximating zero, the transistors Q2, for all practical purposes, are in the non-conducting state.

Reference is now made to the common conductor 17 which connects each of the logic elements L1 through LN in common to switch S2. When the circuit is to be programmed, the switch S2 is in the PO position and conductor 17 is left floating. As a result, the load elements L1 through LN play no part in the operation of the circuit since diodes CR1 through CRN will not conduct for the positive signals applied to the circuit. As a result of programming the logic circuit, certain of the fusible links will have been caused to melt causing open circuits to exist between the cathodes of certain diodes and their corresponding row conductors. Reference is now made to the logic cell in column C1 which is comprised of diodes D11 and D11′ and their corresponding fuse links. It will be noted that the fuse link corresponding to diode D11 has a diagonal slashed line extending through the link. Note also that other similar slashed lines extend through several of the other fuse links within the circuit. These slash lines are used to represent an open fuse link produced as the result of programming the circuit. In contrast, those fuse links not having the diagonal slash are indicative of fuse links which have purposely not been open circuited during programming and which constitute the storage of a data item in the corresponding logic cell.

In order to open circuit a particular fuse link, it is necessary to pass sufficient current through it to cause the fuse to melt. Refer now to the fuse link associated with diode D11′. This fuse link will cause an open circuit under the condition that transistor Q1 associated with conductor 12′ and transistor Q2 corresponding to row R1 are both conducting. Under these conditions, the fuse link associated with D11′ will open as the result of the voltage PP defined with respect to the ground potential of line 12′ which is effectively applied to conductor 24-1 as the result of the action of pattern generator 42. Since PP represents a positive voltage when a fuse link is to be melted, diode D11′ will be forward biased permitting sufficient current to flow from pattern generator 42, through Q1, D11′, the associated fuse link, the column conductor 12′ and Q1 to ground causing the fuse link to open. It is important to realize that this basic operation, as just described, will take place whenever any fuse link is to be open circuited. More specifically, with reference to the example of FIG. 1, that is, when each of the individual diodes and associated fuse link is programmed by means of the row and column decoders 50 and 48 respectively, the fuse links indicated with the diagonal slash in the figure will be open circuited, whereas those without the diagonal slash will not.

Further, in the ensuing description, the open circuiting of each and every fuse link shown with a diagonal slash will not be described, since the principle of operation as just described for D11′ applies similarly for all logic cells.

The slash marks through certain individual ones of the fuse links has been shown merely to illustrate how it is possible through the programming of the logic circuit to configure the storage cells of the circuit to generate a desired logic function or functions. The generation of these functions will be described following a further description of the operation of the programming of the circuit.

As briefly mentioned, addressing of the diodes is accomplished by the column and row counters and the pattern generator. Aside from the addressing provided by the column and row counters, the pattern generator must be programmed to generate the proper series of output signals in synchronism with the column and row counters. This synchronism is accomplished by using a common clock signal T to drive both the counter 52 and the pattern generator 42.

Further, by referring to FIG. 1, it can be seen that all columns and rows must be addressed in order to completely program the circuit. However, in so doing, it is essential that only certain selected fuse links be open circuited. Thus, the addressing of the circuit consists of addressing a total number of logic cell locations equal to the product of the number of rows times the number of column conductors. The pattern generator, therefore, must be programmed to produce a series of signals PP on conductor 30 corresponding only to those fuse links that are to be open circuited.

The circuit of FIG. 1 will not be described, by illustrative example, to show how the logic elements of the circuit may be configured by programming to form a logic circuit capable of generating the output function signals f1 and f2.

To start the programming cycle, assume counter 52 is reset to its zero state, causing all signals on lines 46 and 47 to be at a zero or ground potential. Assume now that the clock signal T is applied via line 36 to counter 52. Assuming only four row conductors, the first four consecutive clock pulses are assumed to cause the row counter to count from 0 to its maximum count. However, since the column counter remains in the reset state of zero, no addressing of individual logic elements takes place during this first row counter sequence. The fifth clock signal applied to the row counter causes it to return to its zero state and simultaneously causes the column counter to advance to a count of one. At the occurrence of the next clock signal T the row counter advances to a count of one with the column counter remaining at its existing count of one. The result is that row 24-1 is addressed by a row address signal applied to the base of Q2 of row R1 and column conductor 12 is addressed by the application of a column address signal applied to the base of transistor Q1 corresponding to conductor 12. Conductor 12 is thus connected to ground through Q1. Diode D11 is now addressed, but, because it is not desired to open circuit the corresponding fuse link, the output signal PP from pattern generator 42 is programmed to remain at ground potential thus preventing the flow of sufficient current to cause the fuse link to melt.

With the next clock signal T, the row counter is advanced to a count of two. Through the action of row decoder 50, as explained, transistor Q2 of the row select switches 40 corresponding to row R2 is now addressed, conductor 12 is still addressed as the result of a count of one in the column counter. Thus, diode D21 is addressed. At this time, since it is desired to open the fuse associated with D21, the output signal PP of pattern generator 42 is applied as a positive voltage pulse to the collector of Q2 in the row select switches 40 corresponding to conductor 24-2, thus causing Q2 to conduct. The resulting current in line 24-2 also flows through diodes D21 and its associated fusible link, returning to ground via conductor 12 and transistor Q1 in the column select switches 44. This current will be sustained until the fuse link of D21 has open circuited at which time no low resistance path will exist between the source of PP and ground and all significant current flow will cease.

The next two clock signals will step the row counter to a count of 3 and 4 respectively thus addressing diodes D31 and DN1 in the same manner as just described. As indicated by the diagonal slash through the fuse links of D31 and DN1, each of these fuse links will be open circuited by corresponding positive voltage pulses PP from the generator 42.

Again, when the row counter achieves its maximum count, the next clock signal will cause the row counter to return to 0 and simultaneously cause the column counter to step to a count of 2. Thus, conductor 12′ is addressed in preparation for programming each of the diodes D11′-DN′.

The programming sequence just described will continue sequentially from left to right, the address of each of the column conductors being maintained through a complete cycle of the addressing of row conductors 24-1 through 24-N which are similarly addressed in sequence. The programming operation terminates when the column and row counters each achieve their maximum count addressing diodes DNM1 of conductor 34. With the column and row counters both at their maximum counts, the next clock signal T will cause both counters to return to a count of 0, thus addressing none of the columns and rows.

Circuitry for automatically terminating the programming operations of FIG. 1 has not been shown but this could be done in a number of ways. One method would be to provide logic which would detect when the counter 52 achieves its maximum count. Such logic would provide an inhibit signal to the input of the counter 52 and the pattern generator 42 to prevent the clock signal T from being applied thereto when the programming operation is finished.

Other ways of automatically terminating the programming operation will appear obvious to those having ordinary skill in the art.

Now that the operation of the circuit of FIG. 1 has been described in the programming mode, its operation will be described in its operational mode. That is, its operation will now be described to illustrate how Boolean functions may be generated in accordance with the programmed pattern of the logic cells contained within the circuit. However, in the ensuing description, only the generation of one product term signal $(A\ \bar{B})$ as shown on row conductor 24-1 and the generation of one function signal, f1 shown on conductor 28 will be described. As previously mentioned, the circuits for performing functions of the type to be described are disclosed and claimed in the copending application by David L. Greer, entitled "Multiple Level Associative Logic Circuits" filed concurrently herewith and assigned to the assignee of the present application.

With reference to FIG. 1, switches S1 and S2 are set to their corresponding states designated as CO. Referring now to row R1 and specifically to conductor 24-1, there is shown a product term signal $(A\ \bar{B})$ which is representative of the states of the binary variable input signals A and B applied to the circuit on conductors 12 and 14 respectively. It will be noted that the fuse links associated with diodes D11 and D12′ have not been open circuited. These two diodes in conjunction with load element L1 comprise an AND gate with inputs A and $\bar{B}$ capable of producing either a binary 1 or a binary 0 signal on line 24-1.

The product term signal $(A\ \bar{B})$ will be generated as a binary 1 signal on conductor 24-1 only when the binary variable signals A and B applied to their respective logic inverters 13 are binary 1 and 0 respectively. Any other combinations of the input signals A and B will generate a binary 0 on conductor 24-1.

Signal $(A\ \bar{B})$ is generated as a binary 1 in the following manner: The signal A is applied as a binary 1, via the fuse link, to the cathode of diode D11 thus preventing diode D11 from conducting. The binary variable signal B is applied as a binary 0 to the input of logic inverter 13 on conductor 14. Thus, the output signal of the inverter 13, $\bar{B}$, is a binary 1. The binary 1 signal $\bar{B}$ is applied to the cathode of diode D12′ on conductor 14′ via its associated fuse link. Diode D12′ is thus prevented from being forward biased. Since both diodes D11 and D12′ are prevented from conducting, the product term signal $(A\ \bar{B})$ is generated as a binary 1 on conductor 24-1.

Referring now to column $CM_a$ and specifically to conductor 28, there is shown the signal f1 which is generated in response to the product term signal $(A\ \bar{B})$ on conductor 24-1.

Diodes D1M through DNM in conjunction with two resistors 19 and 19′ of logic inverter 15 comprise an OR gate capable of producing signal f1 as a binary 1 when either or both of input signals $(A\ \bar{B})$ or $(\bar{A}\ B)$ on conductors 24-1 and 24-2 are a binary 1. The generation of signal $(A\ \bar{B})$ will not be described but it is done in a way analogous to that used to generate $(\bar{A}\ B)$. The function signal f1 is generated on conductor 28 when the binary 1 signal representing either $(A\ \bar{B})$ or $(\bar{A}\ B)$ is applied respectively to the anode of diodes D1M or D2M driving either of both of them into conduction.

Reference is now made to column CM1 and specifically to conductor 34. The diodes in column CM1 as was the case with respect to corresponding diodes in column $CM_a$ also comprise an OR gate. However, with respect to column CM1, the load (resistors 19 and 19′) required in this column which are analogous to those described in connection with column $CM_a$, are not shown connected to conductor 34, such resistors being assumed as a part of the output signal load. An output function signal f2 on conductor 34 is generated when either one or both of input signals $(f1\ \bar{C})$ on conductor 24-3 or $(\overline{f1}\ C)$ on conductor 24-N are binary 1's.

The generation of signal $(f1\ \bar{C})$ will now be described. It will be noted that, in the programming operation previously described, that the cells comprising diodes D33′ and $D3M_a$ have their associated fuse links in the conducting state as is indicated by the absence of a diagonal slash line. Diodes D33′ and $D3M_a$ thus are in the circuit to generate the product term signal $(f1\ \bar{C})$ which is accomplished as follows: The binary variable signal C applied to logic inverter 13 on line 16, is inverted and provided on conductor 16′ as signal $\bar{C}$ which is applied at the cathode of diode D33′ via its fuse link. The function signal f1 is applied after double inversion in logic inverter 15 on conductor 28′ to the cathode of diode $D3M_a$. When both f1 and C are binary 1 signals, diodes D33′ and $D3M_a$ will be non-conducting thus generating the binary 1 signal $(f1\ \bar{C})$ on conductor 24-3 a binary 1 signal on conductor 24-3 will cause diode D3M1 to conduct generating the binary 1 output signal f2 on conductor 34. The generation of signal $(\overline{f1}\ C)$ is analogous to the generation of $(f1\ \bar{C})$ as just explained.

Figure 2:
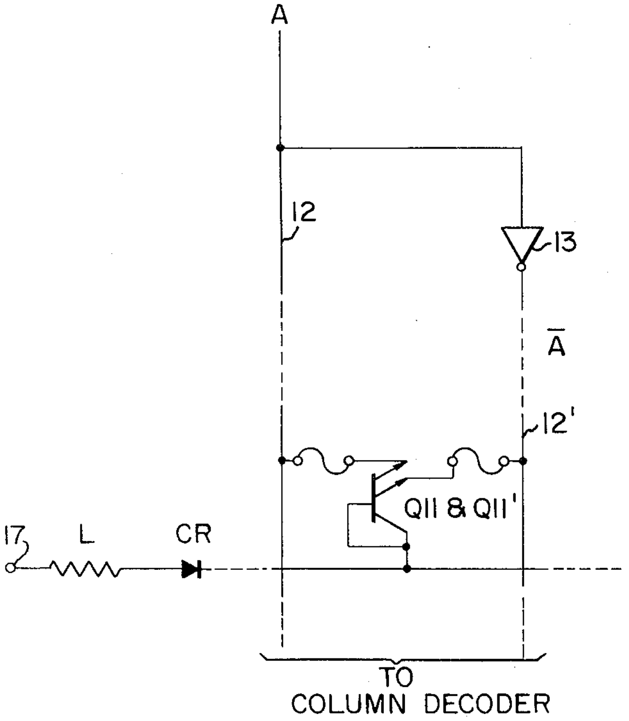
FIGS. 2 and 3 are circuit schematics of bipolar transistors which may be incorporated in the embodiment of FIG. 1 as logic cells.

Reference is now made to FIG. 2 which shows how a double emitter transistor Q11 and Q11′ may replace the diodes, for example, D11 and D11′ in the circuit of FIG. 1. As shown, a load element L is connected to the conductor 17 and to the collector and base of transistor Q11 and Q11′ via the diode CR1 of row R1. With the transistor inserted into the circuit in place of diodes D11 and D11′, the input binary variable signal A is applied on conductor 12 to one of the emitter inputs via a corresponding fuse link. Similarly, the binary variable signal A is inverted through amplifier 13 to signal A on conductor 12′ and applied to the other emitter of transistor Q11 and Q11′, via its associated fuse link. The conductors 12 and 12′ connect to corresponding ones of the transistors Q1 in the column select switches 44.

Figure 3:
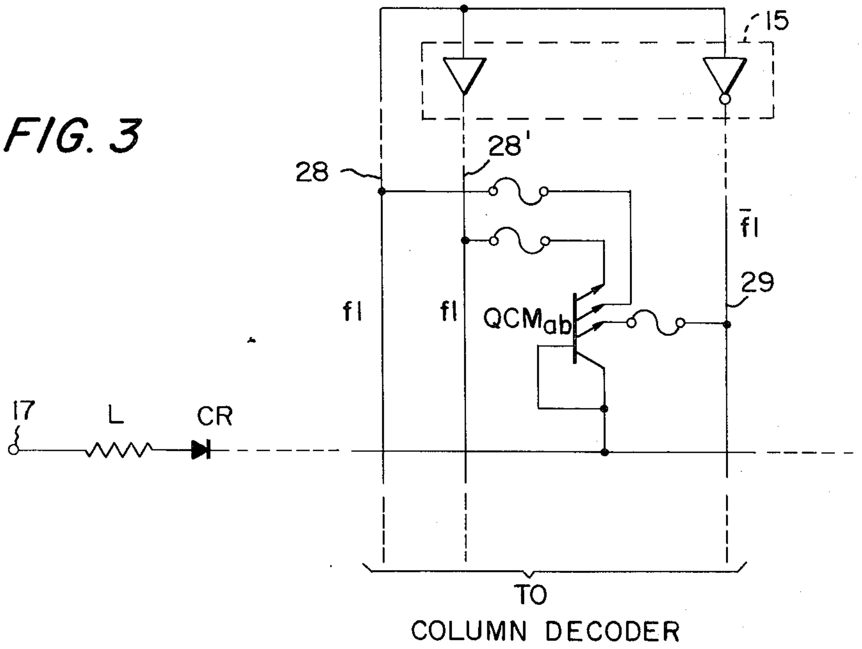

As an example in FIG. 3, a triple emitter transistor $QCM_{ab}$ is shown connected in the circuit as a counterpart of the diodes D1M, $D1M_a$ and $D1M_b$ in columns $CM_a$ and $CM_b$ respectively. In the circuit of FIG. 3, the load element L is connected to the common conductor 17 and to the collector electrode of transistor $QCM_{ab}$ via the diode CR. In this particular implementation, the internally generated signal *f1* may be generated as a consequence of the first emitter of a triple emitter transistor $QCM_{ab}$ and applied via a corresponding fuse link to conductor 28. The counterpart of amplifier 15, as shown in FIG. 1, is also shown in FIG. 3 wherein the signal f1 is applied, non-inverted via inverter 15 on line 28′ to a second one of the emitters of $QCM_{ab}$ via its corresponding fuse link. In a manner similar to that shown in FIG. 1, the signal $\overline{f1}$ is applied through inverter 15 to a third emitter of transistor $QCM_{ab}$ via its corresponding fuse link. The conductors 28, 28′ and 29 are connected to corresponding ones of their transistors Q1 in the column select switches 44.

It can be seen from the above description in connection with FIGS. 2 and 3 that the invention as disclosed in connection with FIG. 1 does not necessarily have to be limited to diode structures. That is, transistors, such as Q11 and Q11′ and $QCM_{ab}$ in FIGS. 2 and 3 respectively, may also be fabricated into the circuit to accomplish the same functions as that achieved by the diodes.

Figure 4:
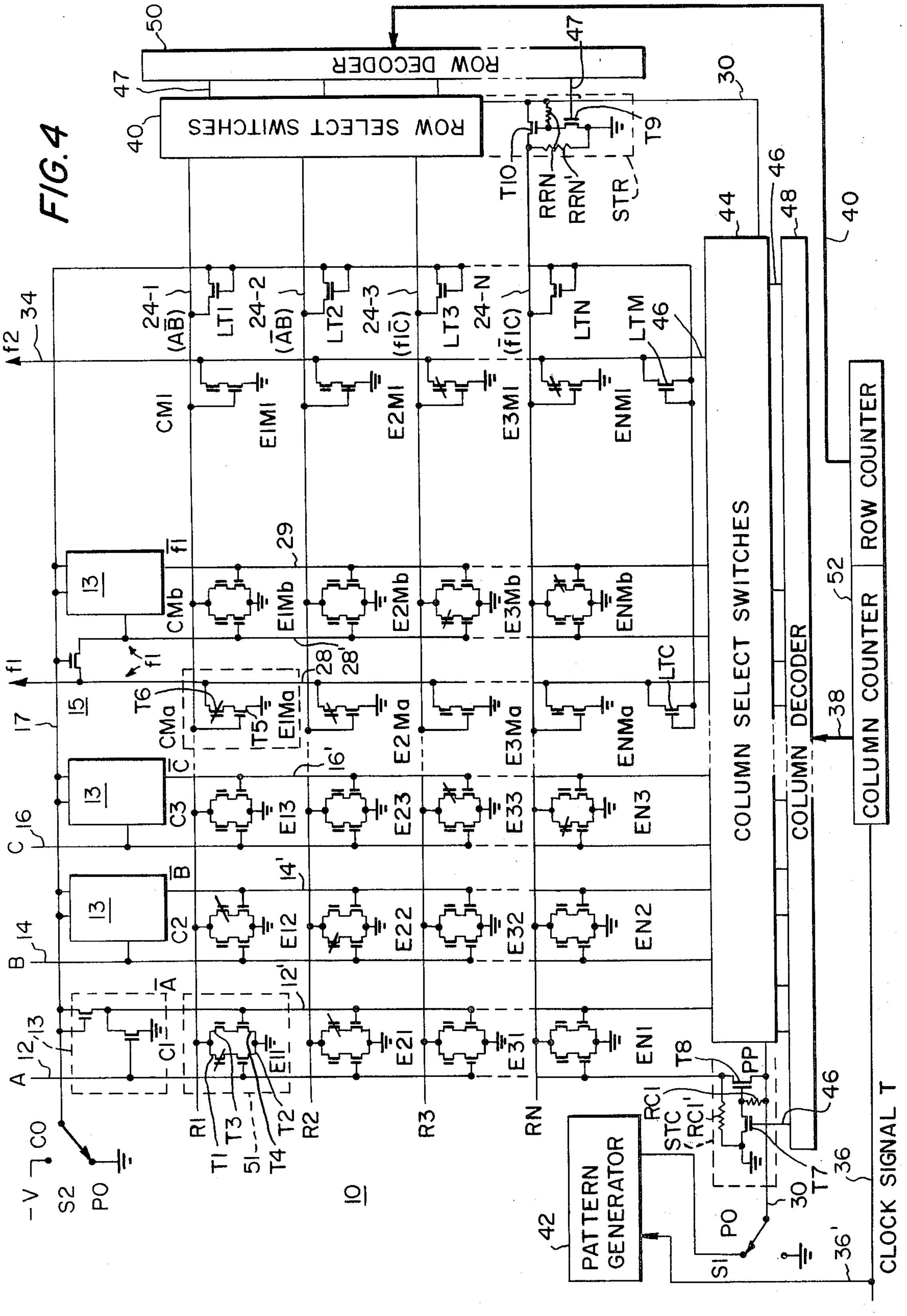
FIG. 4 is a schematic circuit diagram in accordance with the invention utilizing MOS technology wherein field effect transistors are utilized as logic elements.

Reference is now made to FIG. 4 which illustrates another embodiment of the invention wherein like numers and basically the same numbering scheme used in connection with FIG. 1 are incorporated where applicable. That is, the first digit following and E represents the row number and the second digit following the E represents the column number. For example, row R1 is comprised of a plurality of logic cells E11, E12, E13, $D1M_a$, $E1M_b$ and E1M1; and column C1 is comprised of storage cells E11, E21, E31 and EN1.

In FIG. 4, however, instead of using diodes to form the storage cells, a plurality of P-channel enhancement mode field effect transistors are interconnected to form each one of the logic cells. For example, referring to column C1, a typical logic cell 51 is comprised of a plurality of transistors T1, T2, T3, and T4. It will be noted that transistors T1 and T3 are floating gate type field effect transistors. That is, their gate electrodes are not connected to any conductor, whereas the gate electrodes of transistors T2 and T4 have their gate electrodes connected to corresponding ones of the input conductors 12 and 12′ respectively. Further, the source electrodes of each of the transistors T2 and T4 is connected to a common potential ground and their drain electrodes are connected to the source electrodes of transistors T1 and T3 respectively. The drain electrodes of transistors T1 and T3 are connected in common to the row conductor 24-1. It will be noted that each of the other cells E21-EN1 in column C1, E12-EN2 in column C2, E13-EN3 in column C3, and $E1M_b$-$ENM_b$ in column $CM_b$ are identical to cell E11 in column C1.

There are also logic cells comprised of two transistors. A typical one of these cells is indicated as $E1M_a$ is comprised of two transistors T5 and T6. The gate electrode of transistor T5 is connected to conductor 24-1. Transistor T5 has its source electrode connected to the common ground potential and its drain electrode connected to the source electrode of transistor T6. T6 is a floating gate transistor and has its drain electrode connected to conductor 28 for providing the output function signal f1.

It will be noted that each of the other cells $E2M_a$-$ENM_a$ in column $CM_a$ and the cells E1M1-ENM1 in column CM1 are identical to cell $E1M_a$ in column $CM_a$.

The circuit of FIG. 4 also comprises a plurality of load transistors LT1-LTN corresponding to individual ones of the conductors 24-1 through 24-N respectively. Each of the load transistors has its gate and drain electrodes connected in common to potential source conductor 17. Two additional load transistors, LTC and LTM are also included in the circuit. Each of the transistors LTC and LTM also have their gate and drain electrodes connected in common to conductor 17. Load transistor LTC has its source electrode connected to conductor 28 and the source electrode of transistor LTM is connected to conductor 34. The purpose of the above-described load transistors will be subsequently explained.

Reference is now made to the column and row select switches 44 and 40 respectively. In a fashion similar to FIG. 1, switches 44 and 40 also contain select circuits STC and STR (shown in dashed lines of switches 44 and 40) for addressing the column and row conductors. With reference to circuit STC note that transistor T8 has its source electrode connected to line 30 which is connected to switch S1, connected in turn to pattern generator 42. The drain electrode of T8 is connected to conductor 12 and also to one end of resistor RC1′, the other end of RC1′ being connected to ground. The base electrode of T8 is connected to the drain electrode of T7 and to one end of resistor RC1, the other end of which is connected to conductor 30. The source electrode of T7 is connected to ground while its base electrode is connected to the column diodes via conductor 46. Other circuits identical to circuit STC are connected to the ones of the column conductors 12′, 14, 14′, 16, 16′, 28, 28′, 29, and 34. In like manner, an identical circuit represented as STR is shown as a part of the row select switches 40. With reference now to circuit STR note that T9, T10, RRN and RRN′ of circuit STR correspond to like elements T7, T8, RC1, and RC1′ of circuit STC. Circuit STR and other identical circuits are connected to corresponding ones of the row conductors 24-1, 24-2, 24-3, and 24-N. The operation of these select transistors will be described later.

Also, in FIG. 4, the logic inverters 13 and transistor 15 are counterparts and serve purposes analogous to those like-numbered inverters in FIG. 1. The operations of these will also be described subsequently.

In the operation of FIG. 4, the programming of the array is similar to that described in connection with FIG. 1. However, instead of open circuiting a fuse link as done in FIG. 1, particular ones of the transistors in the cells receive and store information in the form of avalanche injected charge on their floating gates. Such charge accumulation on the floating gates of selected transistors causes these transistors to conduct. Transistors without such stored charge represent an open circuit between their source and drain electrodes. Thus data items are stored in those cells wherein the floating gate transistors contain an avalanche induced charge.

The programming operation of FIG. 4 will now be described. Basically, the programming is substantially the same as that just described in relation to FIG. 1. When programming the array, it is important that all of the column and row conductors that are not addressed be permitted to float, so that they can assume the value of the voltages generated by the column and row select switches 44 and 40 respectively. This is accomplished by grounding conductor 17 with S2 in the PO position which causes all of the load transistors LT1-LTN and LTC and LTM to assume an open circuited condition by applying ground to their drain and gate electrodes.

Pattern generator 42 serves in substantially the same manner as previously described in connection with FIG. 1. However, in the case of the configuration of FIG. 4, the voltage on conductor 30 must be held at a minus residual DC voltage level in order to effect programming of the column and row conductors through circuits STC and STR. A typical residual voltage level is minus ten volts DC. When addressing a particular column conductor of a logic cell, however, the residual voltage is increased to a high negative potential by pulse PP. This negative potential is typically minus 40 to 50 volts which is sufficient to affect an avalanche injected change on the floating gate transistor of the cell addressed.

The operation of the column select circuit STC in the column select switches 44 will now be explained. In order to select conductor 12 of column C1 the column decoder applies a zero volt signal on line 46 to the gate electrode of a transistor T7, inhibiting its conduction. The minus residual DC voltage on conductor 30 causes transistor T8 to conduct. Thus, the high negative potential pulse, when it occurs, is transferred to conductor 12 through T8. A negative signal on conductor 46 and thus gate of T7 will drive T7 into conduction thus clamping the gate of T8 to ground, inhibiting its conduction. When T8 is thus prevented from conducting column conductor 12 will not be addressed. Resistor RC1', connected from ground to the drain electrode of T8 serves to keep conductor 12 at ground potential when T8 is not conducting. The operation of other circuits STC in column select switches 44 is analogous to the one described. The row select circuits contained in row select switches 40 operate in a way analogous to the circuits STC.

The programming of circuit 10 of FIG. 4 is accomplished sequentially by means of the column and row counter 52, column and row decoders 48 and 50 respectively, the column and row select switches 44 and 40 respectively and the pattern generator 42. The method of sequential addressing of logic cells as explained in relation to FIG. 1 applies also to the circuit of FIG. 4 and therefore need not be repeated or explained further.

The method by which a stored charge is established on the gate of transistors T1 will now be described. Assume column conductor 12 and row conductor 24-1 are addressed following the most recent clock signal T. As previously explained in connection with the operation of circuits STC and STR, transistors T8 and T9 will be in their conducting state. Thus, due to the residual negative DC voltage on conductor 30, conductors 12 and 24-1 will be at a corresponding negative potential, causing T2 of cell 51 to be in a conducting state. As indicated by the slash line through floating gate transistor T1, a stored charge is required on the gate electrode of T1 and is accomplished by providing a high negative potential pulse PP from pattern generator 42 via conductor 30, transistor T10, conductor 24-1 to the drain of T1. The applied pulse results in an avalanche injected charge being established on the floating gate electrode of T1 as required. Following the occurrence of the next clock pulse, column conductor 12 and row conductor 24-2 are addressed. The sequence of events will be analogous to those just explained with the exception that no stored charge is required and thus the high negative pulse PP will not occur. It is to be noted that the residual DC voltage is not sufficient to cause avalanche charge injection to take place.

Assume now that logic cell $E1M_a$ is addressed and that therefore the residual voltage exists on conductors 24-1 and 28. Under these conditions, transistor T5 will be in its conducting state and a high voltage pulse on the column conductor 28 will cause an avalanche injected charge on the corresponding floating gate transistor T6 as required and indicated by a slash line through T6. Note that since the pulse voltage PP, when it occurs, appears simultaneously on both the column and row conductors, the connection of the floating gate transistors can be made to any of these conductors without changing the basic method of addressing and programming as has just been explained.

From the foregoing description of various embodiments of the invention, it is apparent how a wide range of logic circuits may be implemented by means of a single or small group of basic logic device simply by means of electrical programming. It is also clear that the electrical programming feature does in no way limit the versatility of associative logic devices as compared to similar devices which do not contain this feature.

While the principles of the invention have now been made clear in the preferred embodiment, there will be immediately obvious to those skilled in the art many modifications of structure, arrangement, proportions, the elements, materials, and components used in the practice of the invention and otherwise which are particularly adapted for specific environments and operating requirements without departing from those principles. The appended claims are, therefore, intended to cover and embrace any such modifications within the limits only of the true scope of the invention.

I claim:

1. An electrically programmable associative logic circuit adapted to be programmed to form a logic circuit capable of generating output function signals representative of specified Boolean functions in response to input signals, said logic circuit comprising:

an array of logic cells each having an input terminal and an output terminal, said logic cells being arranged in orthogonally disposed columns and rows;

a plurality of input connecting means each associated with one of the columns of logic cells and providing input variables in binary signal form to the input terminals of first predetermined logic cells in that column, the binary input signals being individual to each such column;

a plurality of row conductor means each associated with one of the rows of logic cells and connected to the output terminals of said first predetermined logic cells in that row, at least one of said row conductor means further being connected to the output terminals of second predetermined logic cells in its respective row, and at least one of said row conductor means further being connected to the input terminals of third predetermined logic cells in its respective row;

one or more column conductor means each associated with one of the columns of logic cells and connected to the output terminals of said third predetermined logic cells in that column, at least one of said column conductor means further being connected to the input terminals of said second predetermined logic cells in its respective column; and programming means for applying address signals to each of said plurality of row conductor means and to each of said plurality of column conductor means, said address signals addressing each of said plurality of logic cells to effect open and closed circuit paths through said plurality of logic cells to configure said plurality of logic cells to form a logic circuit capable of generating output function signals in response to binary variable signals applied to said plurality of input means.

2. A logic circuit as set forth in claim 1 wherein each of said plurality of logic cells comprises:

at least one diode, each having first and second terminals;

a fuse link connected at one end thereof to the first terminal of said diode, the other end of said fuse link and the second terminal of said diode each serving as either one of the input and output terminals of said plurality of logic cells.

3. A logic circuit as set forth in claim 1 wherein each of said plurality of logic cells comprises:

a transistor having a base, a collector and first and second emitters;

first and second fuse links, each connected at one end thereof to a corresponding one of the first and second emitters of said transistor, the other end of each of said first and second fuse links being connected to either one of a corresponding one of said plurality of input means and said plurality of column conductor means, and the base and the collector of said transistor being connected in common to a corresponding one of said plurality of row conductor means.

4. A logic circuit as set forth in claim 1 wherein each of said second and third predetermined logic cells comprises:

a transistor having a base, a collector and first, second and third emitters;

first, second and third fuse links, each connected at one end thereof to a corresponding one of the first, second and third emitters, the other end of each of said first, second and third fuse links being connected to a corresponding one of said plurality of column conductor means, and the base and the collector of said transistor being connected in common to a corresponding one of said plurality of row conductor means.

5. A logic circuit as set forth in claim 1 wherein each of said first and second predetermined logic cells comprises:

first, second, third and fourth transistors, each having a gate electrode, a source electrode and a drain electrode, the source electrodes of said second and fourth transistors being connected in common to a potential source, the drain electrodes of said first and third transistors being connected in common to a corresponding one of said plurality of row conductor means the drain electrode of each of said second and fourth transistors being connected to the source electrode of each of said first and third transistors respectively, the gate electrode of each of said second and fourth transistors being connected to either one of a corresponding one of said plurality of input means and said plurality of column conductor means, said first and third transistors having floating gate electrodes wherein the floating gate electrode of either of said first and third transistors store an avalanche injected charge representative of the storage of a data item.

6. A logic circuit as set forth in claim 1 wherein each of said third predetermined logic cells comprises:

first and second transistors, each having gate, source and drain electrodes, the source electrode of said first transistor being connected to a potential source, the drain electrode of said second transistor being connected to a corresponding one of said plurality of column conductor means, the drain electrode of said first transistor being connected to the source electrode of said second transistor, the gate electrode of said first transistor being connected to a corresponding one of said plurality of row conductor means, said second transistor having a floating gate electrode wherein the floating gate electrode stores an avalanche injected charge representative of the storage of a data item.

7. An electrically programmable associative logic circuit adapted to be programmed to form a logic circuit capable of generating output function signals representative of specified Boolean functions in response to inputs signals, said logic circuit comprising:

an array of logic cells each having an input terminal and an output terminal, said logic cells being arranged in orthogonally disposed columns and rows;

a plurality of input connecting means each associated with one of the columns of logic cells and providing input variables in binary signal form to the input terminals of first predetermined logic cells in that column, the binary input signals being individual to each such column;

a plurality of row conductor means each associated with one of the rows of logic cells and connected to the output terminals of said first predetermined logic cells in that row, at least one of said row conductor means further being connected to the output terminals of second predetermined logic cells in its respective row, and at least one of said row conductor means further being connected to the input terminals of third predetermined logic cells in its respective row;

one or more column conductor means each associated with one of the columns of logic cells and connected to the output terminals of said third predetermined logic cells in that column, at least one of said column conductor means further being connected to the input terminals of said second predetermined logic cells in its respective column;

first address means for sequentially applying first address signals to said plurality of column conductor means in response to a predetermined pattern of pulse signals applied to said first address means from an external source; and second address means for sequentially applying second address signals to said plurality of row conductor means in response to a predetermined pattern of pulse signals from said external source, said first and second address signals sequentially addressing each of said plurality of logic cells to effect open and closed circuit paths through said plurality of logic cells wherein the open and closed circuit paths are representative of the storage of a data item in each of said plurality of logic cells and wherein the open and closed circuit paths define a logic circuit configuration capable of generating output function signals in response to binary variable signals applied to said plurality of input means.

8. The combination comprising:

an array of logic cells each having an input terminal and an output terminal, said logic cells being arranged in orthogonally disposed columns and rows;

a plurality of input connecting means each associated with one of the columns of logic cells and providing input variables in binary signal form to the input terminals of first predetermined logic cells in that column, the binary input signals being individual to each such column;

a plurality of row conductor means each associated with one of the rows of logic cells and connected to the output terminals of said first predetermined logic cells in that row, at least one of said row conductor means further being connected to the output terminals of second predetermined logic cells in its respective row, and at least one of said row conductor means further being connected to the input terminals of third predetermined logic cells in its respective row;

one or more column conductor means each associated with one of the columns of logic cells and connected to the output terminals of said third predetermined logic cells in that column, at least one of said column conductor means further being connected to the input terminals of said second predetermined logic cells in its respective column;

signal generating means, responsive to a clock signal applied thereto, for generating a predetermined pattern of output signals;

programming means, said programming means including:

register means, responsive to the clock signal, for generating first and second programming signals, first and second decode means, said first decode means for decoding the first programming signals and generating first address signals in response to the first programming signals, said second decode means for decoding the second programming signals and generating second address signals in response to the second programming signals;

first and second select means, said first select means, responsive to the first address signals of said first decode means and the predetermined pattern of output signals of said signal generating means, for selectively providing column address signals to each of said plurality of column conductor means, said second select means, responsive to the second address signals of said second decode means and the predetermined pattern of output signals of said signal generating means, for selectively providing row address signals to each of said plurality of row conductor means, the column and row address signals selectively addressing each of said plurality of logic cells to effect open and closed circuit paths through said plurality of logic cells to form a logic circuit capable of generating the output function signals in response to the binary variable input signals, the binary variable input signals being applied to said plurality of input means.

9. A logic circuit as set forth in claim 1 wherein said programming means comprises:

register means, responsive to clock signals applied thereto, for generating first and second programming signals;

first and second decode means, said first decode means decoding the first programming signals and generating first address signals in response to the first programming signals, said second decode means decoding the second programming signals and generating second address signals in response to the second programming signals; and first and second select means, either of said first and second select means receiving a predetermined pattern of signals applied thereto, said first select means responsive to the first address signals of said first decode means and the predetermined pattern of signals for selectively providing distinctive column address signals to each of said plurality of column conductor means, said second select means, responsive to the second address signals of said second decode means and the predetermined pattern of signals, for selectively providing distinctive row address signals to each of said plurality of row conductor means.

10. A logic circuit as set forth in claim 9 wherein each of said plurality of input means and each of said column conductor means includes a load element connecting each thereof to a potential source.

11. A logic circuit as set forth in claim 9 wherein said register means comprises first and second counters, each capable of achieving a predetermined count, said first counter counting the clock signals and sequentially generating the first programming signals in response thereto and said second counter sequentially generating the second programming signals in response to the clock signals when said first counter achieves a predetermined count.

12. A logic circuit as set forth in claim 2 wherein each of said plurality of row conductor means includes a series connected load element and diode connected at one end thereof to the row conductor means and connected in common at the opposite ends thereof and adapted to be connected to a potential source.

* * * * *